United States Patent
Yasooka et al.

(10) Patent No.: US 9,470,602 B2
(45) Date of Patent: Oct. 18, 2016

(54) AIRTIGHTNESS INSPECTION METHOD AND AIRTIGHTNESS INSPECTION APPARATUS FOR SEALED BATTERY

(75) Inventors: Takeshi Yasooka, Yamato (JP); Toshihiko Kamiya, Yokohama (JP); Itaru Tamura, Nagaokakyo (JP); Akira Suzuka, Nagaokakyo (JP); Shunji Noda, Zama (JP); Takuya Takatsuka, Zama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 692 days.

(21) Appl. No.: 13/704,849

(22) PCT Filed: Jun. 15, 2011

(86) PCT No.: PCT/JP2011/063733
§ 371 (c)(1),
(2), (4) Date: Feb. 21, 2013

(87) PCT Pub. No.: WO2011/158878
PCT Pub. Date: Dec. 22, 2011

(65) Prior Publication Data
US 2013/0141571 A1    Jun. 6, 2013

(30) Foreign Application Priority Data

Jun. 17, 2010   (JP) .................. 2010-138499

(51) Int. Cl.
G01M 3/36   (2006.01)
G01M 3/32   (2006.01)
(Continued)

(52) U.S. Cl.
CPC .............. *G01M 3/36* (2013.01); *G01M 3/363* (2013.01); *G01M 3/38* (2013.01); *H01M 10/04* (2013.01); *H01M 10/4228* (2013.01); *H01M 10/48* (2013.01); *H01M 2/0267* (2013.01)

(58) Field of Classification Search
CPC ........ G01M 3/36; G01M 3/32; H04N 5/225; H01G 9/00
See application file for complete search history.

(56) References Cited

U.S. PATENT DOCUMENTS

2004/0134259 A1   7/2004   Haug et al.
2004/0201699 A1*  10/2004  Parulski et al. ......... 348/207.99
(Continued)

FOREIGN PATENT DOCUMENTS

CN    1517689 A    8/2004
GB    2 384 554 A  7/2003
(Continued)

OTHER PUBLICATIONS

Taiwanese Office Action dated Mar. 3, 2014 (6 pgs.).
(Continued)

*Primary Examiner* — Sath V Perungavoor
*Assistant Examiner* — Patricia I Young
(74) *Attorney, Agent, or Firm* — Foley & Lardner LLP (57) ABSTRACT

A soft packaged sealed battery is contained in an airtight container. The airtight container is decompressed and images of the surface shape of the sealed battery in the airtight container before and after decompression are captured by a CCD camera or the like. Whether or not airtightness of the sealed battery is maintained is determined based on a change in the captured images, e.g. a change in the surface shape appearing as luminance differences of pixels. By this determination method, highly accurate airtightness determination is realized by eliminating the influence of invisible fine creases on a sealed battery surface.

10 Claims, 7 Drawing Sheets

(51) Int. Cl.
    *H01G 9/00*     (2006.01)
    *H01M 2/12*     (2006.01)
    *H04N 5/225*     (2006.01)
    *H01M 10/04*     (2006.01)
    *H01M 10/42*     (2006.01)
    *H01M 10/48*     (2006.01)
    *G01M 3/38*     (2006.01)
    *H01M 2/02*     (2006.01)

(56) References Cited

U.S. PATENT DOCUMENTS

2010/0028567 A1     2/2010     Suizu et al.
2011/0005050 A1*     1/2011     Shimura et al. ............. 29/25.03

FOREIGN PATENT DOCUMENTS

| | | |
|---|---|---|
| JP | 08-045541 A | 2/1996 |
| JP | 9-33230 A | 2/1997 |
| JP | 9-229813 A | 9/1997 |
| JP | 2001-4338 A | 1/2001 |
| JP | 2001-135363 A | 5/2001 |
| JP | 2004-93208 A | 3/2004 |
| JP | 2004093208 A * 3/2004 ............. G01M 3/32 |
| JP | 4089389 B2 | 5/2008 |
| JP | 2008-153119 A | 7/2008 |
| KR | 10-2004-0065522 A | 7/2004 |
| SU | 1 728 699 A1 | 4/1992 |
| TW | 200834061 A | 8/2008 |

OTHER PUBLICATIONS

Russian Office Action with English Language Translation dated Mar. 18, 2014 (8 pgs.).
Korean Office Action dated Dec. 23, 2013, (5 pgs.).
Korean Office Action dated Jun. 20, 2014, 5 pgs.
Russian Decision on Grant and English language translation, dated Jun. 26, 2014, 14 pgs.

* cited by examiner

AIRTIGHTNESS INSPECTION METHOD AND AIRTIGHTNESS INSPECTION APPARATUS FOR SEALED BATTERY

FIELD OF THE INVENTION

This invention relates to airtightness inspection for a soft packaged sealed battery in which a battery main body is contained in a battery case such as a laminated film.

BACKGROUND OF THE INVENTION

Japanese Patent No. 4089389 issued by the Japan Patent Office in 2008 proposes an airtightness inspection method for a battery case of a sealed battery.

In this airtightness inspection method, a first process of supplying gas into an airtight container enclosing a sealed battery for pressurization and a second process of discharging the gas in the airtight container to return a pressure in the airtight container to a normal pressure are performed, dimensions of the battery having gone through these processes are measured and compared with standard dimensions to determine whether airtightness of a battery case is good or poor.

If there is a pinhole or a crack on the battery case, the gas enters the battery case during the first process. If the pressure of the airtight container is reduced in the second process, the gas in the battery case is discharged through the pinhole or the crack, but this discharge rate is slower than a pressure reduction rate of the airtight container. As a result, the battery case temporarily expands.

By measuring the dimensions at this time point and comparing them with the standard dimensions, existence of any pinhole or crack on the battery case can be diagnosed.

SUMMARY OF THE INVENTION

If the battery case is made of a deformable material such as a laminated film, invisible crease-like unevenness is formed on the surface of the case in a manufacturing process, which may affect the dimensions of the battery case. Further, an individual difference in the thickness of a battery main body also affects the dimensions of the battery case. Thus, airtightness inspection methods according to the prior art technologies cannot necessarily achieve a high inspection precision for such soft package type sealed batteries.

It is therefore an object of this invention to provide a highly accurate inspection method and inspection apparatus suitable for airtightness inspection for soft package type sealed batteries.

In order to achieve the above object, this invention provides an airtightness inspection method for a sealed battery. The method comprises measuring a surface shape of the sealed battery enclosed in an airtight container, decompressing the airtight container, measuring a surface shape of the sealed battery in the decompressed airtight container, and determining airtightness of the sealed battery based on a change in the surface shape of the sealed battery before and after decompression.

The details as well as other features and advantages of this invention are set forth in the remainder of the specification and are shown in the accompanying drawings.

DESCRIPTION OF THE PREFERRED EMBODIMENTS

Figure 1A:
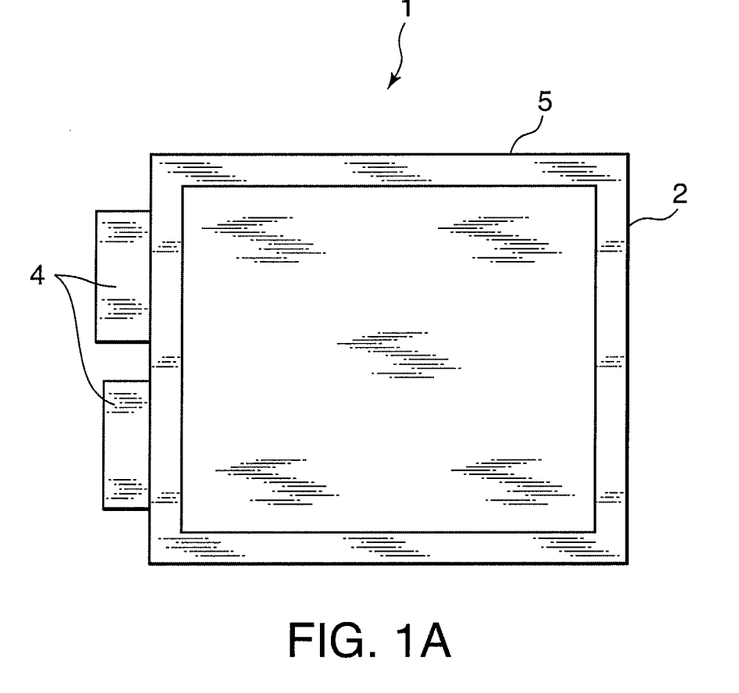
FIGS. 1A and 1B are a plan view and a cross-sectional view of a soft packaged sealed battery, respectively.
Figure 1B:
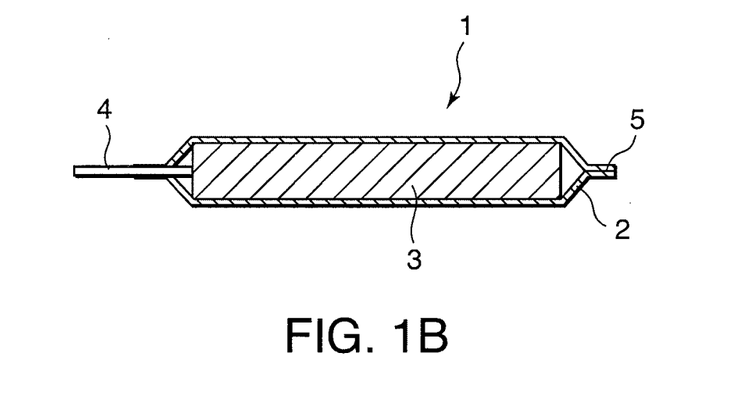

Referring to FIGS. 1A and 1B of the drawings, a soft packaged sealed battery 1 comprises a battery case 2 made of a laminated film in which a metal foil of aluminum or the like is laminated with resin, a battery element 3 composed of a laminated body impregnated with an electrolyte, and a pair of electrode terminals 4.

The pair of electrode terminals 4 is taken out from the battery case 2. The battery case 2 has a substantially rectangular planar shape and is composed of a pair of members made of laminated films including a recess in a central part. The battery element 3 is housed in the facing recesses of these members. The battery case 2 is formed by bonding peripheral edge parts 5 of these members to each other in a negative pressure environment.

In such a soft packaged sealed battery 1, the battery case 2 is easily deformed to form crease-like unevenness on a surface. These creases include creases that are invisible. Further, an individual difference in the thickness of the battery element 3 affects the thickness of the battery case 2. An airtightness inspection method and an airtightness inspection apparatus according to this invention realize highly accurate airtightness inspection by eliminating the influence given by the invisible creases and the individual difference in the thickness of the battery element 3.

Figure 2:
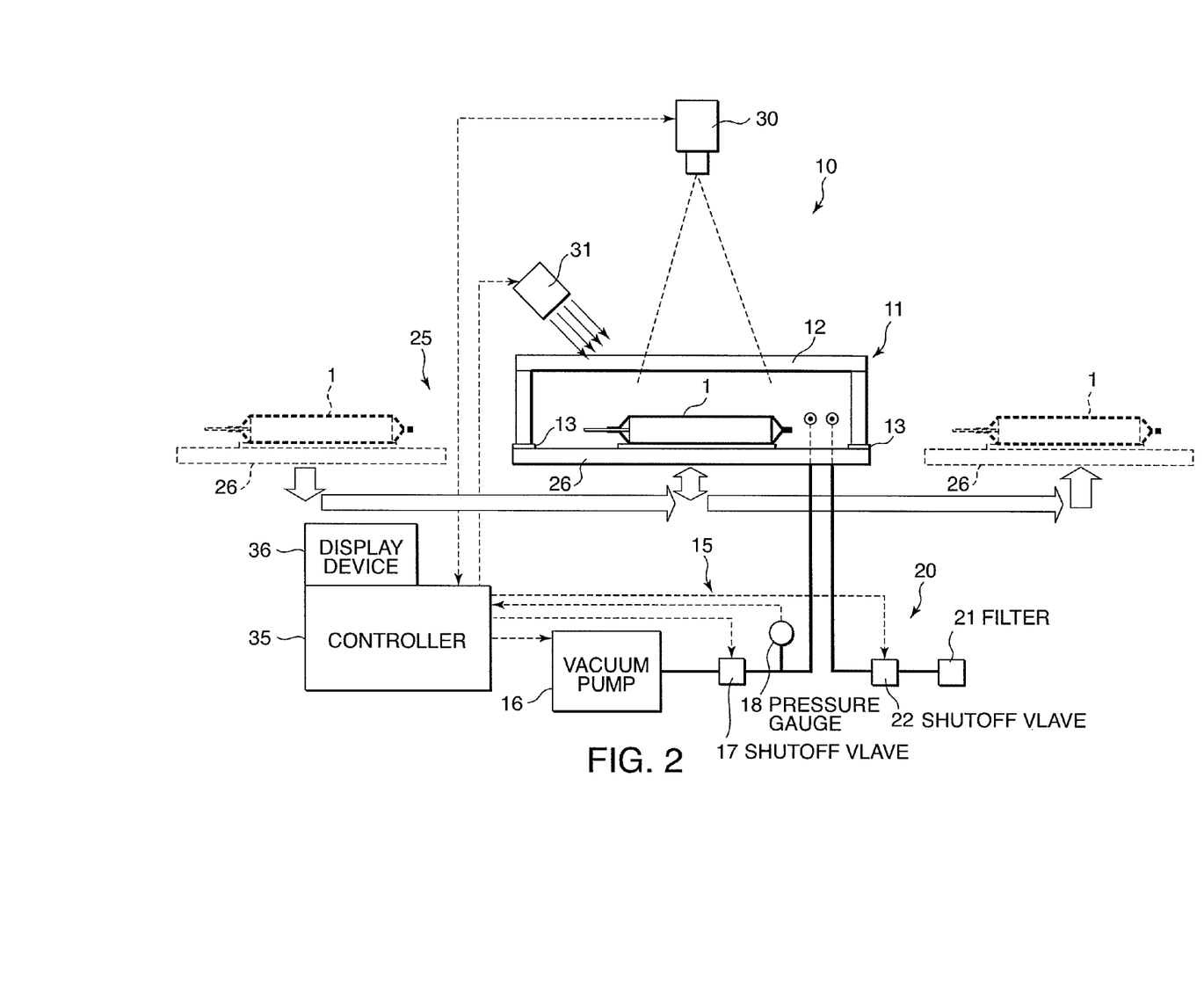
FIG. 2 is a schematic diagram of an airtightness inspection apparatus according to this invention.

Referring to FIG. 2, an airtightness inspection apparatus 10 comprises an airtight container 11, a decompression device 15 for decompressing the interior of the airtight container 11 into a vacuum state, an air introduction device 20 for returning a pressure in the airtight container 11 from the vacuum state to an atmospheric pressure and a carrier device 25 for loading and unloading the sealed battery 1 into and from the airtight container 11.

The airtightness inspection apparatus 10 further comprises an illumination device 31 for illuminating a surface of the sealed battery 1 in the airtight container 11 and a charge coupled device (CCD) camera 30 for capturing an image of the surface of the sealed battery 1 in the airtight container 11 in a fixed direction.

The operation of each of the decompression device 15, the air introduction device 20, the carrier device 25, the illumination device 31 and the CCD camera 30 is controlled by a controller 35. The controller 35 also stores video images captured by the CCD camera 30, analyzes the stored images and determines whether airtightness of the sealed battery 1 is good or poor.

The controller 35 is constituted by a microcomputer comprising a central processing unit (CPU), a read-only memory (ROM), a random access memory (RAM), and an input/output interface (I/O interface). The controller may be constituted by a plurality of microcomputers.

The airtightness inspection apparatus 10 further comprises a display device 36 for displaying an image of the battery case 2 captured by the CCD camera 30 and a processing result of the image of the battery case 2 by the controller 35.

The airtight container 11 is held at a fixed position. The airtight container 11 is in the form of a box whose upper surface is formed of a transparent plate 12 and whose lower surface is open. A carrying table 26 of the carrier device 25 carrying the sealed battery 1 is held in close contact with the open lower surface, whereby a sealed space is created inside the airtight container 11.

To ensure sealing of the airtight container 11, a seal 13 is arranged on the lower surface of the airtight container 11. By pressing the carrying table 26 against the seal 13 from below, the seal 13 blocks the space inside the airtight container 11 from outside air.

The illumination device 31 is provided above the airtight container 11 to illuminate the sealed battery 1 in the airtight container 11. The CCD camera 30 is fixed above the airtight container 11 to capture an image of the surface of the sealed battery 1 under illumination by the illumination device 31.

The illumination device 31 may be a device that illuminates the entire sealed battery 1 by one light or a device that illuminates vicinities of four sides of the sealed battery 1 in a divided manner.

For example, a CCD with two million pixels is used in the CCD camera 30. The CCD camera 30 captures an image of the surface shape such as unevenness and creases of the surface of the sealed battery 1 projected to an imaging area and transmits the captured image to the controller 35. In other words, each pixel of the imaging area of the CCD camera 30 produces a luminance signal representing reflected light corresponding to the surface shape such as unevenness or creases of the surface of the sealed battery 1 illuminated by the illumination device 31. The luminance of each pixel of the imaging area is stored in a memory of the controller 35.

Note that the camera is not limited to the CCD camera as long as it expresses an image by a collection of pixels. For example, it is also possible to use a complementary metal-oxide semiconductor (CMOS) camera. Further, the number of pixels of the camera only has to be sufficient to detect invisible creases and is not necessarily limited to two million.

The carrier device 25 carries the sealed battery 1 placed on the carrying table 26 in a previous process to below the airtight container 11 as shown by an arrow of FIG. 2. The carrier device 25 raises the carrying table 26 below the airtight container 11, brings the carrying table 26 in close contact with the lower surface of the airtight container 11 and encloses the sealed battery 1 in a sealed state in the airtight container 11. The carrier device 25 further separates the carrying table 26 from the airtight container 11 and carries the sealed battery 1 to a subsequent process as shown by an arrow of FIG. 2.

The decompression device 15 comprises a vacuum pump 16 connected to the airtight container 11 via a pipe, a shutoff valve 17 disposed at an intermediate position of the pipe and a pressure gauge 18 for detecting an internal pressure of the airtight container 11. In the case of decompressing the airtight container 11, the shutoff valve 17 is opened in accordance with a command signal of the controller 35 and the vacuum pump 16 is driven to decompress the airtight container 11. The controller 35 closes the shutoff valve 17 and keeps the interior of the airtight container 11 in a negative pressure state when the pressure detected by the pressure gauge 18 reaches a predetermined negative pressure.

A negative pressure tank may be provided in the decompression device 15 such that the interior of the airtight container 11 is decompressed using a negative pressure of the negative pressure tank, whereas the vacuum pump 16 is occasionally driven to keep a predetermined negative pressure in the negative pressure tank. According to such a configuration, the airtight container 11 can be rapidly decompressed at the same time as the shutoff valve 17 is opened. A time required for a decompression process of the airtight container 11 can thus be shortened.

The air introduction device 20 comprises a pipe for exposing the airtight container 11 to outside air via a filter 21 and a shutoff valve 22 disposed at an intermediate position of the pipe. The controller 35 can open the shutoff valve 22 and introduces air into the airtight container 11 decompressed by the decompression device 15 to restore the pressure in the airtight container 11 to the atmospheric pressure.

Figure 3:
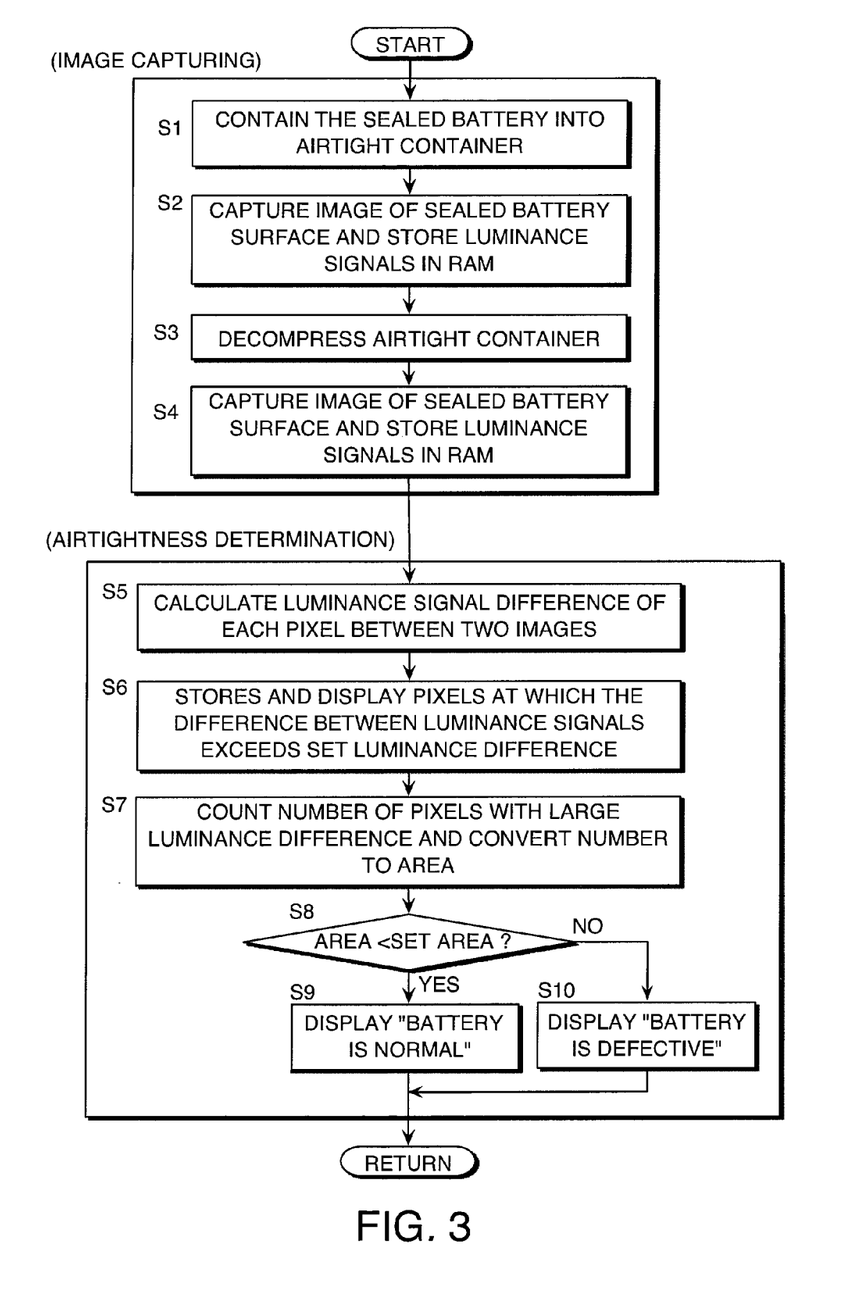
FIG. 3 is a flow chart showing an airtightness inspection routine executed by a controller according to this invention.

Referring to FIG. 3, an airtightness inspection routine for the sealed battery 1 executed by the controller 35 in the airtightness inspection device 10 configured as described above will be described. This routine is executed for each sealed battery 1.

In a step S1, the controller 35 drives the carrier device 25 to contain the sealed battery 1 into the airtight container 11. Specifically, the carrying table 26 carrying the sealed battery 1 is moved to a predetermined position below the airtight container 11, raised from the predetermined position and pressed against the opening of the airtight container 11 from below. This causes the sealed battery 1 to be contained into the airtight container 11. At this stage, the shutoff valve 22 of the air introduction device 20 is open and the shutoff valve 17 of the decompression device 15 is closed. Thus, the airtight container 11 is kept at one atmospheric pressure.

In a step S2, the controller 35 causes the CCD camera 30 to capture an image of the surface of the sealed battery 1 in an atmospheric pressure environment in a state where the illumination device 31 illuminates the surface of the sealed battery 1 from the outside of the sealed battery 1. Reflected light corresponding to the surface shape such as unevenness or creases of the surface of the sealed battery 1 illuminated by the illumination device 31 is input into the imaging area of the CCD of the CCD camera 30. Each pixel of the CCD inputs a luminance signal corresponding to brightness of the reflected light to the controller 35. The controller 35 stores the input signal as an image signal in the atmospheric pressure state in the RAM.

The sealed battery 1 is contained in the battery case 2 by bonding the peripheral edge parts 5 of the battery case 2 to each other in the negative pressure environment and preserved in the atmospheric pressure environment while being contained in the battery case 2.

Figure 4:
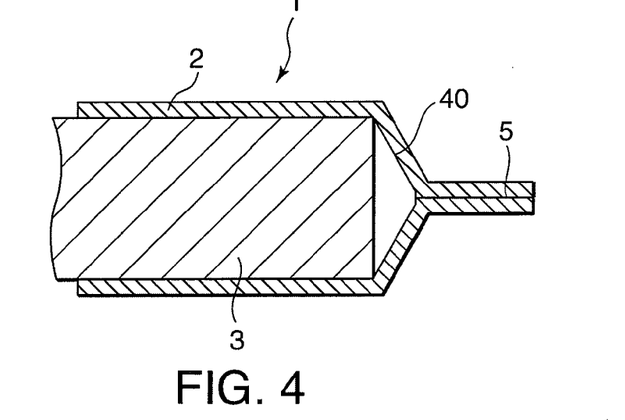
FIG. 4 is an enlarged cross-sectional view of essential parts of the sealed battery.

Referring to FIG. 4, if there is an airtightness failure point 40 such as a pinhole in the battery case 2 due to a sealing failure or a scratch, air around the battery case 2 enters the battery case 2 through the airtightness failure point 40 due to a pressure difference between the inside and outside of the battery case 2 and the internal pressure of the battery case 2 approximates to the atmospheric pressure. The soft packaged battery case 2 is easily deformed and invisible crease-like unevenness tends to be formed on the surface. An individual difference in the thickness of the battery element 3 also affects dimensions of the battery case 2.

Thus, even if an image of the sealed battery 1 is captured by the CCD camera 30 at this point of time, it cannot be immediately determined from a luminance signal of each pixel of the CCD whether the sealed battery 1 is a good sealed battery 1 with the battery case 2 kept in the negative pressure state at the time of manufacturing or a defective sealed battery 1 with the battery case 2 whose internal pressure has increased.

In a step S3, the controller 35 closes the shutoff valve 22 of the air introduction device 20, opens the shutoff valve 17 of the decompression device 15 and drives the vacuum pump 16 to decompress the airtight container 11. When the interior of the airtight container 11 is decompressed into a predetermined vacuum state, the controller 35 closes the shutoff valve 17 of the decompression device 15 to keep the airtight container 11 in a predetermined decompressed state.

Figure 5A:
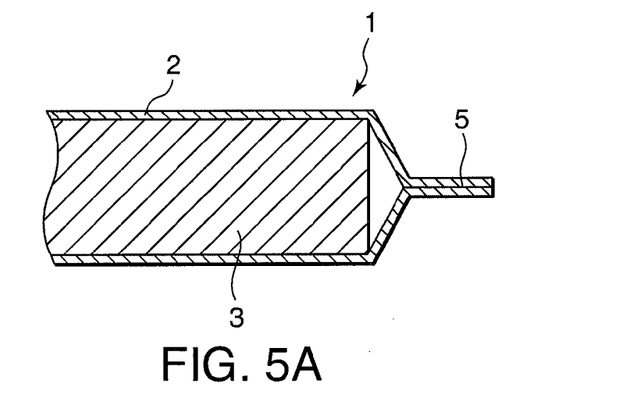
FIGS. 5A and 5B are enlarged cross-sectional views of the essential parts of the sealed battery at the time of decompression.
Figure 5B:
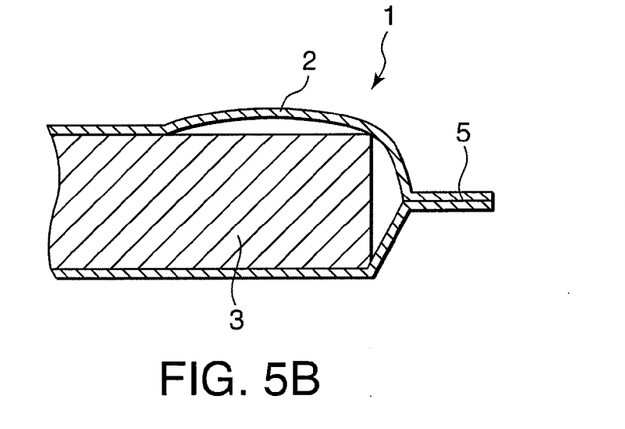

The defective sealed battery 1 having the airtightness failure point 40 shows the following change when the pressure in the airtight container 11 rapidly becomes negative. That is, the internal pressure of the battery case 2 relatively increases due to the pressure in the airtight container 11 becoming negative. This pressure change in the battery case 2 causes the battery case 2 to slightly expand as shown in FIG. 5B or generates invisible fine creases on the surface of the battery case 2. As a result, the battery case 2 is deformed.

On the other hand, in the good sealed battery 1 free from any airtightness failure point 40, the pressure in the battery case 2 is held in the negative pressure state at the time of manufacturing even in the atmospheric pressure environment. In this case, even if the airtight container 11 is decompressed into the predetermined decompressed state, the battery case 2 is retained in the original shape as shown in FIG. 5A since the internal pressure of the battery case 2 is substantially equal to an ambient pressure of the airtight container 11.

Providing that the negative pressure is expressed by an absolute value, the predetermined decompressed state of the airtight container 11 corresponds to a negative pressure sufficient to cause the deformation of the defective sealed battery 1 and equal to or lower than an internal pressure in finally sealing the battery case 2 at the time of manufacturing.

If the magnitude of the negative pressure is insufficient, the expansion and deformation of the battery case 2 become smaller, thereby reducing precision in detecting a defective. If the magnitude of the negative pressure is excessive, there is a possibility of expanding and deforming the good sealed battery 1. An optimal value for the predetermined decompressed state is determined by an experiment or a simulation in advance.

In a step S4, the controller 35 causes the CCD camera 30 to capture an image of the sealed battery 1 in a state where the illumination device 31 is illuminating the surface of the sealed battery 1. The CCD of the CCD camera 30 outputs luminance signals representing reflected light corresponding to unevenness or creases on the surface of the battery case 2 of the sealed battery 1 illuminated by the illumination device 31. The luminance signal is output for each pixel and stored in the RAM of the controller 35.

After the image capturing by the CCD camera 30 is finished, the controller 35 opens the shutoff valve 22 of the air introduction device 20, thereby introducing air into the airtight container 11 and restoring the pressure in the airtight container 22 to the atmospheric pressure.

The processings of the above steps S1 to S4 constitute an image capturing process and the processings of steps S5 to S10 constitute an airtightness determination process based on the captured images. Note that although not shown in the flow chart, the carrier device 25 separates the carrying table 26 carrying the sealed battery 1 downward from the airtight container 11 and carries it to the subsequent process in parallel to the airtightness determination process.

In the step S5, the controller 35 calculates a luminance signal difference of each pixel between the image captured in the decompressed state and the image captured under the atmospheric pressure stored in the RAM. A difference between luminance signals stored for each pixel is calculated.

In a step S6, the controller 35 stores the pixel, at which the difference between the luminance signals exceeds a luminance difference set in advance, in the RAM together with the position thereof. Further, the image captured in the decompressed state, the image captured under the atmospheric pressure and an image indicating a difference between them are displayed on the display device 36. The luminance difference set in advance is, for example, about 30/256.

Figure 6:
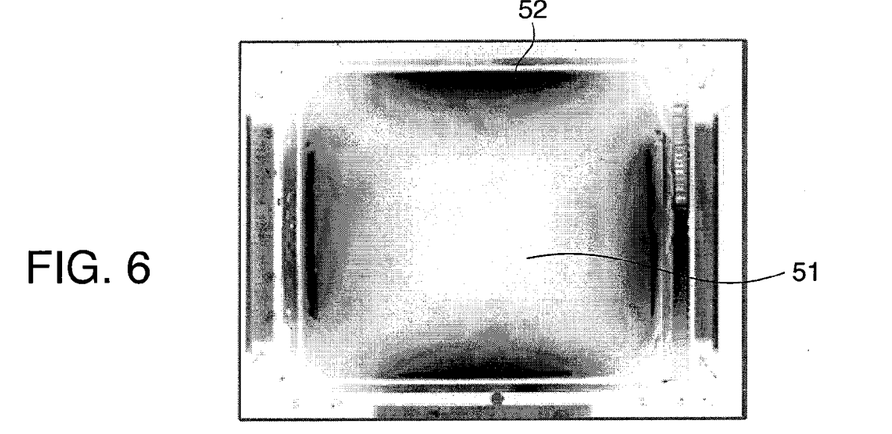
FIG. 6 shows an image of the sealed battery captured by a charge coupled device (CCD) camera at one atmosphere pressure.
Figure 7:
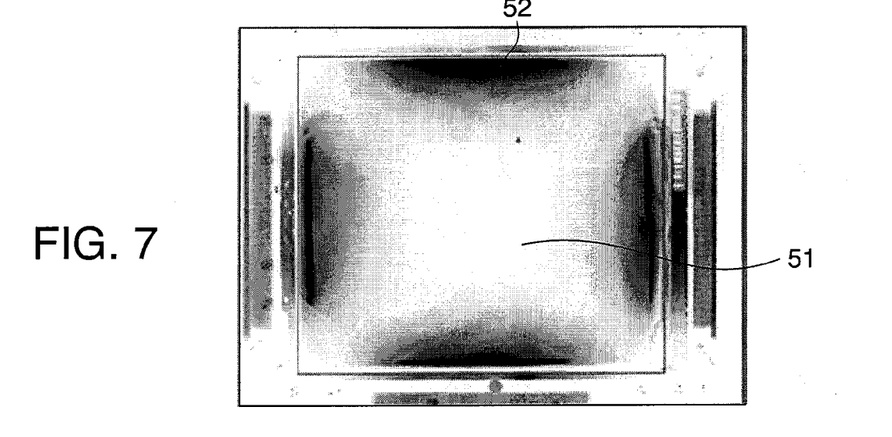
FIG. 7 shows an image of the sealed battery captured by the CCD camera in a decompressed state.
Figure 8:
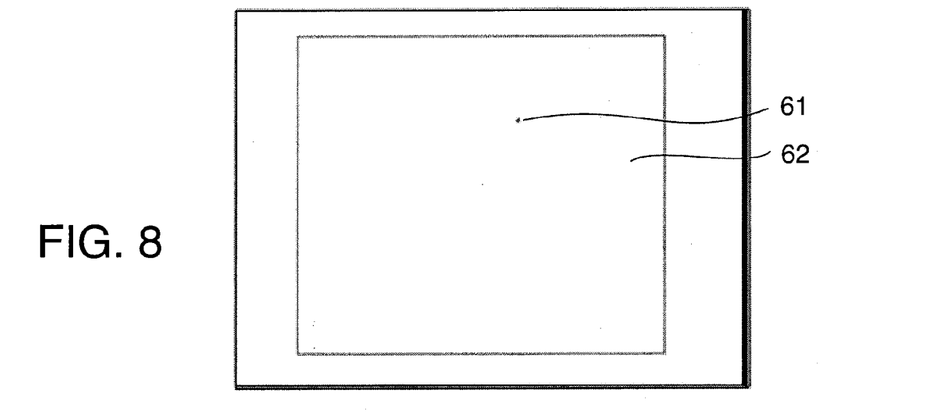
FIG. 8 shows an image showing a luminance difference of each pixel between the image of FIG. 6 and the image of FIG. 7.
Figure 9:
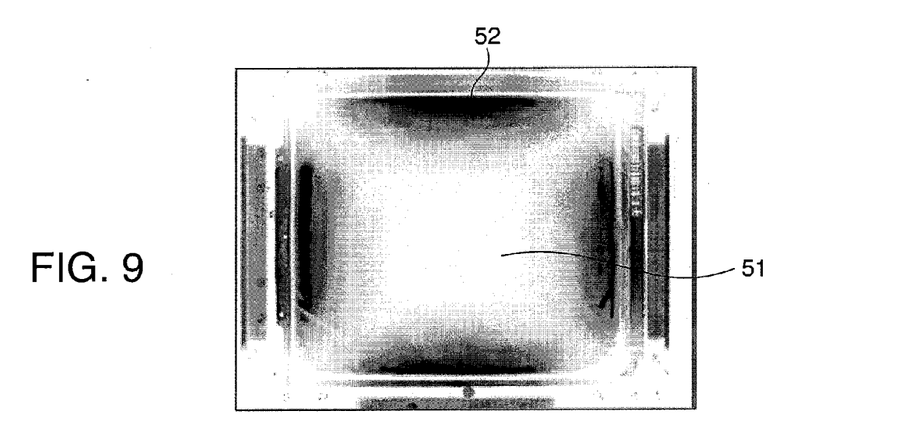
FIG. 9 shows an image of the sealed battery captured by the CCD camera at one atmosphere pressure when there are fine creases on a battery case.
Figure 10:
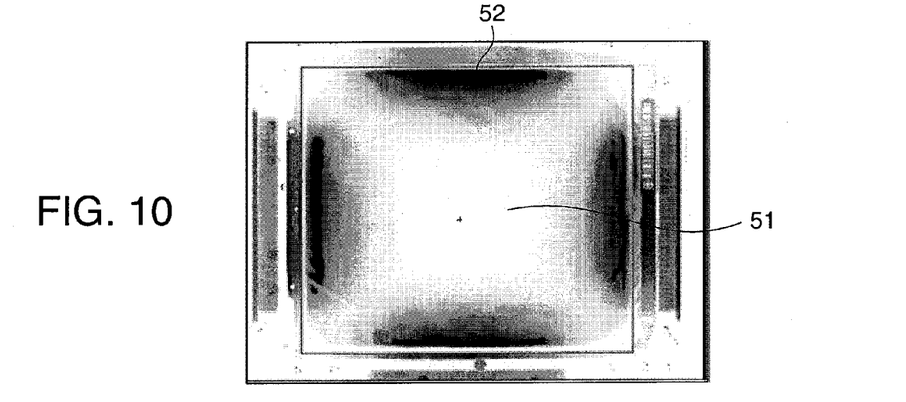
FIG. 10 shows an image of the sealed battery captured by the CCD camera in the decompressed state when there are fine creases on the battery case.
Figure 11:
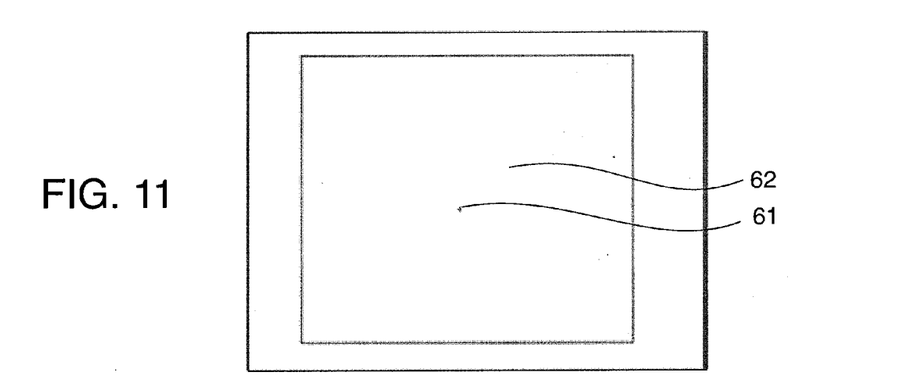
FIG. 11 shows an image showing a luminance difference of each pixel between the image of FIG. 8 and the image of FIG. 9.
Figure 12:
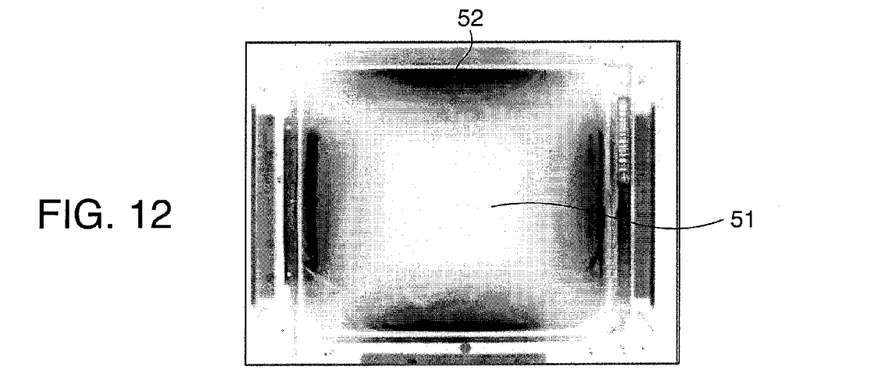
FIG. 12 shows an image of the sealed battery captured by the CCD camera at one atmosphere pressure when there are fine creases on the battery case and airtightness is impaired.
Figure 13:
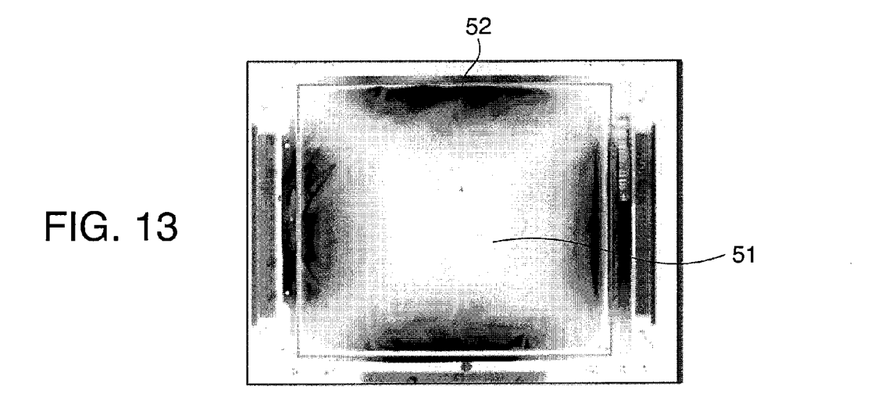
FIG. 13 shows an image of the sealed battery captured by the CCD camera in the decompressed state when there are fine creases on the battery case and airtightness is impaired.
Figure 14:
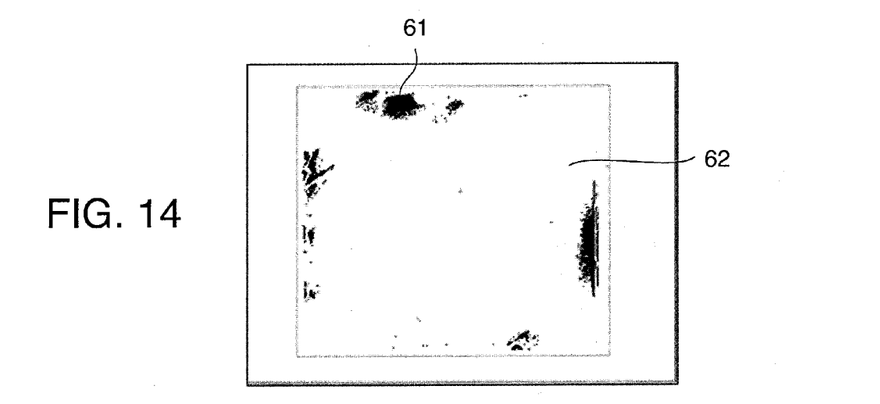
FIG. 14 shows an image showing a luminance difference of each pixel between the image of FIG. 12 and the image of FIG. 13.

FIGS. 6, 9 and 12 show the battery case 2 whose image was captured by the CCD camera 30 in the step S2 when the airtight container 11 was in the atmospheric pressure state. FIGS. 7, 10 and 13 show the battery case 2 whose image was captured by the CCD camera 30 in the step S4 when the airtight container 11 was in the decompressed state. FIGS. 8, 11 and 14 respectively correspond to differences between FIGS. 6 and 7, between FIGS. 9 and 10 and between FIGS. 12 and 13 calculated in the step S5 by the controller 35. Specifically, the pixels with a luminance change exceeding the set luminance difference between the atmospheric pressure state and the decompressed state are shown. Rectangles shown in these figures indicate an existence area of the battery case 2.

Note that any of FIGS. 6, 7, 9, 10, 12 and 13 is shown in a black-and-white inverted state to facilitate display. Accordingly, a black part 51 displayed on the display device 36 indicates the pixels with a high luminance and a white part 52 indicates the pixels with a low luminance. Further, concerning FIGS. 8, 11 and 14, a black part 61 displayed on the display device 36 indicates the pixels with a luminance difference exceeding the set luminance difference and a white part 62 indicates the pixels with a luminance difference equal to or below the set luminance difference.

In a step S7, the controller 35 counts the number of the pixels with the luminance difference exceeding the set luminance difference stored in the step S6. From the counted pixel number and a resolution of the CCD camera 30, an area of the battery case 2 corresponding to the pixel number is calculated.

In a step S8, the controller 35 determines whether or not the area calculated in the step S7 is less than an area set in advance. If the determination of the step S8 is affirmative, an indication that the inspected sealed battery 1 is normal is displayed on the display device 36 in a step S9. The area set in advance is preferably an area equivalent to a range of 0.1 to 0.3% of a total pixel number, for example, if the pixel number of the CCD camera 30 is 1 to 2 million.

If the determination of step S9 is negative, an indication that the inspected sealed battery 1 is defective is displayed on the display device 36 in the step S10.

After the processing of the step S9 or S10, the controller 35 terminates the routine.

FIGS. 6 to 14 show examples of images displayed on the display device 36 obtained by executing the above airtightness inspection routine for the sealed battery 1. FIGS. 6 to 8 show an example of the sealed battery 1 determined to be normal since there are only a small number of invisible creases and airtightness is maintained. FIGS. 9 to 11 show an example of the sealed battery 1 determined to be normal since airtightness is maintained although invisible creases are present. FIGS. 12 to 14 show an example of the sealed battery 1 determined to be defective since airtightness is not maintained.

Concerning the sealed battery 1 of FIGS. 6 to 8, the number of the pixels determined to have a luminance difference by the difference calculation was 10. Concerning the sealed battery 1 of FIGS. 9 to 11, the number of the pixels determined to have a luminance difference by the difference calculation was 33. Even if invisible fine creases are formed on the battery case 2 of the sealed battery 1 in the manufacturing process, the influence thereof is eliminated in FIG. 11 showing the difference since the creases appear in both FIGS. 9 and 10. Thus, according to this airtightness inspection apparatus 10, the influence of invisible creases formed in the manufacturing process of the sealed battery 1 on airtightness inspection can be eliminated.

On the other hand, concerning the sealed battery 1 of FIGS. 12 to 14, the number of the pixels determined to have a luminance difference by the difference calculation was 38771. In this case, a large number of creases are detected in FIG. 13 showing the image in the decompressed state. This is not detected in FIG. 12 showing the image in the atmospheric pressure state. As a result, the formation of a large number of creases is indicated on FIG. 14 showing the difference. In this figure, it is shown that the number of the pixels determined to have a luminance difference as a result of the difference calculation is drastically increased.

In this way, the CCD camera 30 accurately detects even invisible fine creases. As a result, the presence and absence of creases of the battery case 2 do not affect airtightness inspection when there is no airtightness failure point 40 such as a pinhole, whereas the creases formed by a decompression treatment in the step S3 due to the airtightness failure point 40 such a pinhole surely increase the difference.

Thus, according to this airtightness inspection apparatus 10, airtightness of the soft packaged sealed battery 1 can be determined with precision only by detecting a change in the surface shape of the sealed battery 1 by the CCD camera 30.

The first image capturing of the sealed battery 1 by the CCD camera 30 in the step S2 can be completed in a short time since it is performed under the atmospheric pressure. Further, the second image capturing of the sealed battery 1 by the CCD camera 30 in the step S4 is performed after the airtight container 11 is rapidly decompressed in step S3. The expansion and deformation of the battery case 2 are promoted by rapid decompression, whereas rapid decompression brings about a preferable effect in improving detection precision since the amount of gas entering the battery case 2 or the amount of gas discharged from the battery case 2 is suppressed to a low level. Further, a time for transition into the decompression state can be shortened, with the result that an inspection time required for inspection of one sealed battery 1 can be shortened. Furthermore, suppressing substance leakage from the battery case 2 is preferable in terms of suppressing the amount of gas discharged from the battery case 2 to a low level.

Further, by using the airtight container 11 with the transparent upper surface, the CCD camera 30 can be installed outside the airtight container 11. Thus, the volume of the airtight container 11 can be reduced and a time required to decompress the airtight container 11 can be shortened.

The contents of Tokugan 2010-138499, with a filing date of Jun. 17, 2010 in Japan, are hereby incorporated by reference.

Although the invention has been described above with reference to a certain embodiment, the invention is not limited to the embodiment described above. Modifications and variations of the embodiment described above will occur to those skilled in the art, within the scope of the claims.

INDUSTRIAL FIELD OF APPLICATION

As described above, this invention improves detection precision for airtightness of a soft packaged sealed battery. This brings about a preferable effect in improving inspection precision and inspection efficiency for airtightness of, for example, a secondary battery for automotive vehicle.

The embodiments of this invention in which an exclusive property or privilege is claimed are defined as follows:
1. An airtightness inspection method for a sealed battery having a battery element sealed into a battery case in a negative pressure environment, the battery case being made of a deformable film, the method comprising:
    enclosing the sealed battery in an airtight container;
    measuring a surface shape of the sealed battery enclosed in the airtight container;
    decompressing the airtight container under a predetermined negative pressure that is smaller in absolute pressure value than a negative pressure of the negative pressure environment applied for sealing the battery element into the battery case;
    measuring a surface shape of the sealed battery in the airtight container in a decompressed state where the predetermined negative pressure is maintained; and
    determining airtightness of the sealed battery based on a change in the surface shape of the sealed battery between before decompression of the airtight container and in the decompressed state of the airtight container.
2. The airtightness inspection method for the sealed battery as defined in claim 1, wherein the surface shape of the airtight container before decompression is measured in a state where an inner space of the airtight container is in an atmospheric pressure, the decompression of the airtight container under the predetermined negative pressure is performed rapidly, and the change in the surface shape of the sealed battery includes an expansion of the battery case or generation of invisible fine creases on the surface of the battery case in the decompressed state.

3. The airtightness inspection method for the sealed battery as defined in claim 1, wherein the surface shape of the sealed battery before decompression and the surface shape of the sealed battery in the decompressed state of the airtight container are measured by capturing images of the sealed battery by a digital photographic apparatus with the sealed battery illuminated; and the change in the surface shape of the sealed battery is determined by comparing, pixel by pixel, an image of the sealed battery captured before decompression and an image of the sealed battery captured in the decompressed state of the airtight container.

4. The airtightness inspection method for the sealed battery as defined in claim 3, further comprising determining whether or not a difference between a luminance of a pixel of the image captured before decompression and a luminance of the pixel of the image captured in the decompression state exceeds a set value; and determining whether or not airtightness of the sealed battery is maintained based on the number of pixels with a luminance difference exceeding the set value.

5. The airtightness inspection method for the sealed battery as defined claim 4, further comprising:

calculating an area with a difference in the surface shape from the number of the pixels with a difference exceeding the set value and a resolution of the digital photographic apparatus; and determining whether or not airtightness of the sealed battery is maintained based on the area with the difference in the surface shape.

6. An airtightness inspection apparatus for a sealed battery, having a battery element sealed into a battery case in a negative pressure environment, the battery case being made of a deformable film, the method, comprising:

an airtight container for containing the sealed battery;

measurement means for measuring a surface shape of the sealed battery enclosed in the airtight container;

decompression means for decompressing the airtight container under a predetermined negative pressure that is smaller in absolute pressure value than a negative pressure of the negative pressure environment applied for sealing the battery element into the battery case; and determination means for determining airtightness of the sealed battery based on a change in a surface shape of the sealed battery between before decompression of the airtight container and a decompressed state of the airtight container where the predetermined negative pressure is maintained, wherein the measurement means is configured to measure the surface shape of the sealed battery in the airtight container in the decompressed state where the predetermined negative pressure is maintained.

7. The airtightness inspection apparatus for the sealed battery as defined in claim 6, wherein the measurement means comprises a digital photographic apparatus for capturing an image of the surface shape of the sealed battery and the determination means comprises a programmable controller programmed to:

store an image captured by the digital photographic apparatus;

determine whether or not a difference between a luminance of a pixel of an image captured before decompression and a luminance of the pixel of an image captured in the decompressed state exceeds a set value; and determine whether or not airtightness of the sealed battery is maintained based on the number of pixels with a luminance difference exceeding the set value.

8. The airtightness inspection apparatus for the sealed battery as defined in claim 6, wherein the digital photographic apparatus is installed outside the airtight container; and at least a part of the airtight container is formed of a transparent material to enable image capturing of the sealed battery by the digital photographic apparatus.

9. The airtightness inspection apparatus for the sealed battery as defined in claim 6, wherein the airtight container has an opening that is open toward outside air; and the airtightness inspection apparatus further comprises a carrier device that carries the sealed battery and engages with the opening so as to tightly close the airtight container with the sealed battery enclosed.

10. The airtightness inspection apparatus for the sealed battery as defined in claim 6, further comprising:

a display device for displaying an image captured by the digital photographic apparatus before decompression, an image captured by the digital photographic apparatus in the decompressed state of the airtight container, and pixels with a luminance difference exceeding a set value.

* * * * *